United States Patent

[11] 3,629,884

| [72] | Inventor | Clyde A. Brown |
| | | 1080 Estes St., Lakewood, Colo. 80215 |
| [21] | Appl. No. | 848,156 |
| [22] | Filed | Aug. 7, 1969 |
| [45] | Patented | Dec. 28, 1971 |

[54] CAMPER-BOAT-TRAILER
7 Claims, 8 Drawing Figs.

[52] U.S. Cl. .................................................... 9/1 T, 114/61
[51] Int. Cl. ........................................... B63c 13/00
[50] Field of Search........................................... 9/1, 1 TR, 2, 400; 114/.5, 61, 60, 70, 665 F; 296/23, 23 MC; 115/0.5 A

[56] References Cited
UNITED STATES PATENTS

| 2,199,186 | 4/1940 | Quintana .................... | 115/0.5 X |
| 2,543,349 | 2/1951 | Britton ...................... | 296/23 X |
| 2,992,444 | 7/1961 | Schuler ...................... | 9/1 |
| 3,042,942 | 7/1962 | Howe ......................... | 9/1 |
| 3,095,585 | 7/1963 | Thomas ....................... | 9/1 |
| 3,134,991 | 6/1964 | Levinson ..................... | 9/1 |
| 3,265,025 | 8/1966 | Haigh et al. ................. | 9/1 |
| 3,335,437 | 8/1967 | Judkins ....................... | 9/1 |
| 3,434,166 | 3/1969 | Clymer ........................ | 9/1 |
| 3,436,774 | 4/1969 | Schmitz ....................... | 9/1 |
| 3,473,839 | 10/1969 | Elble ......................... | 9/1 |
| 2,965,412 | 12/1960 | Henderson et al. ............. | 296/23 |
| 3,515,406 | 6/1970 | Endsley, Jr. .................. | 296/23 X |

*Primary Examiner*—Milton Buchler
*Assistant Examiner*—F. K. Yee
*Attorney*—C. B. Messenger ABSTRACT: A pontoon-type boat unit adapted as a navigable support to receive and float a camper of the type normally carried by pickup trucks. The camper then protects and provides utility and living comfort for passenger occupants. On land the unit is moved in a narrow telescoped configuration as a trailer supported by wheels that are retractable for water use. Transfer of the camper from and to the truck and the boat-trailer is facilitated by roller and guide elements or alternately by truck-powered movements when the pontoons are in retracted position and camper support jacks are used. A cab-over-type camper provides shelter for an operator control station.

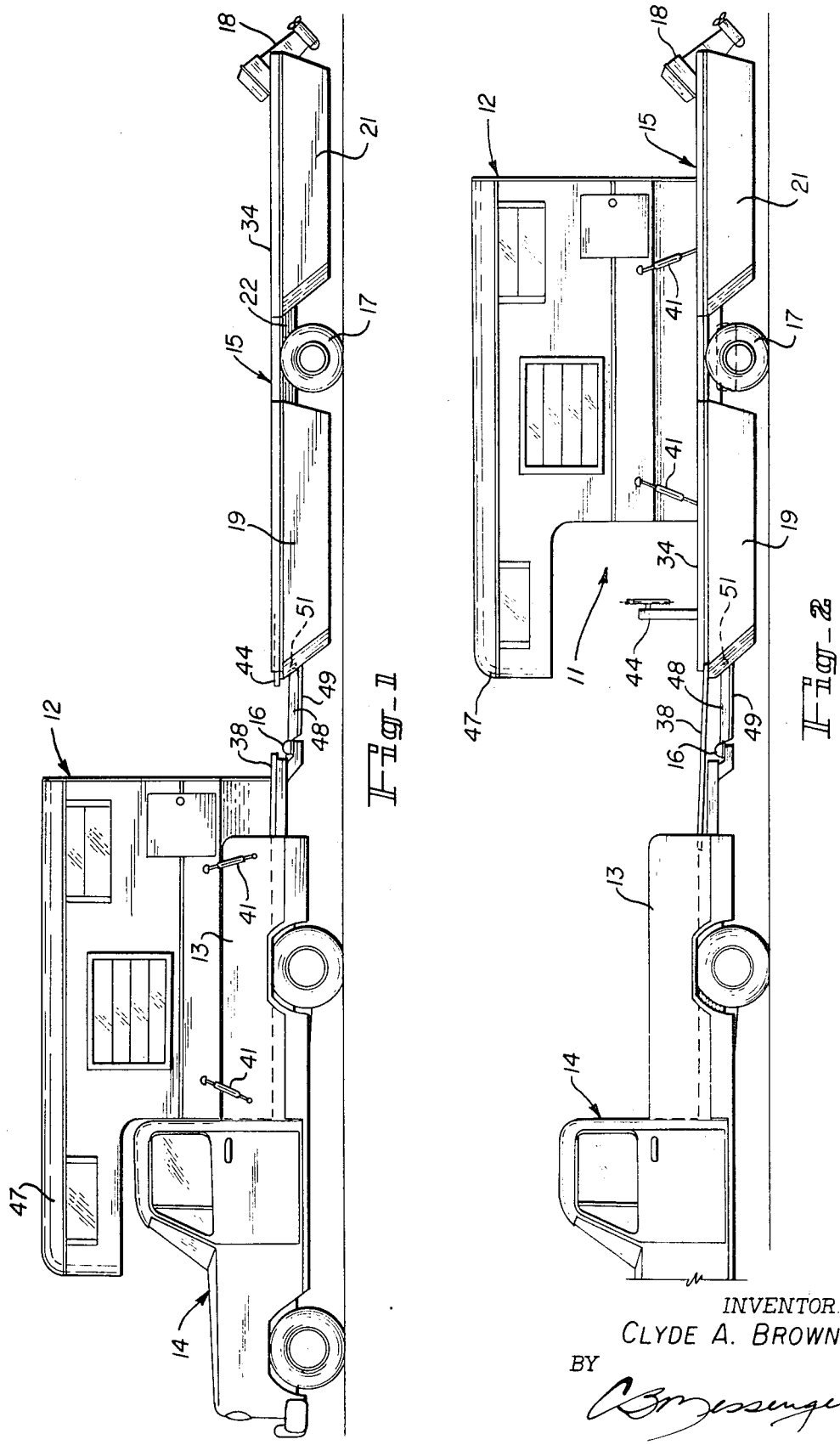

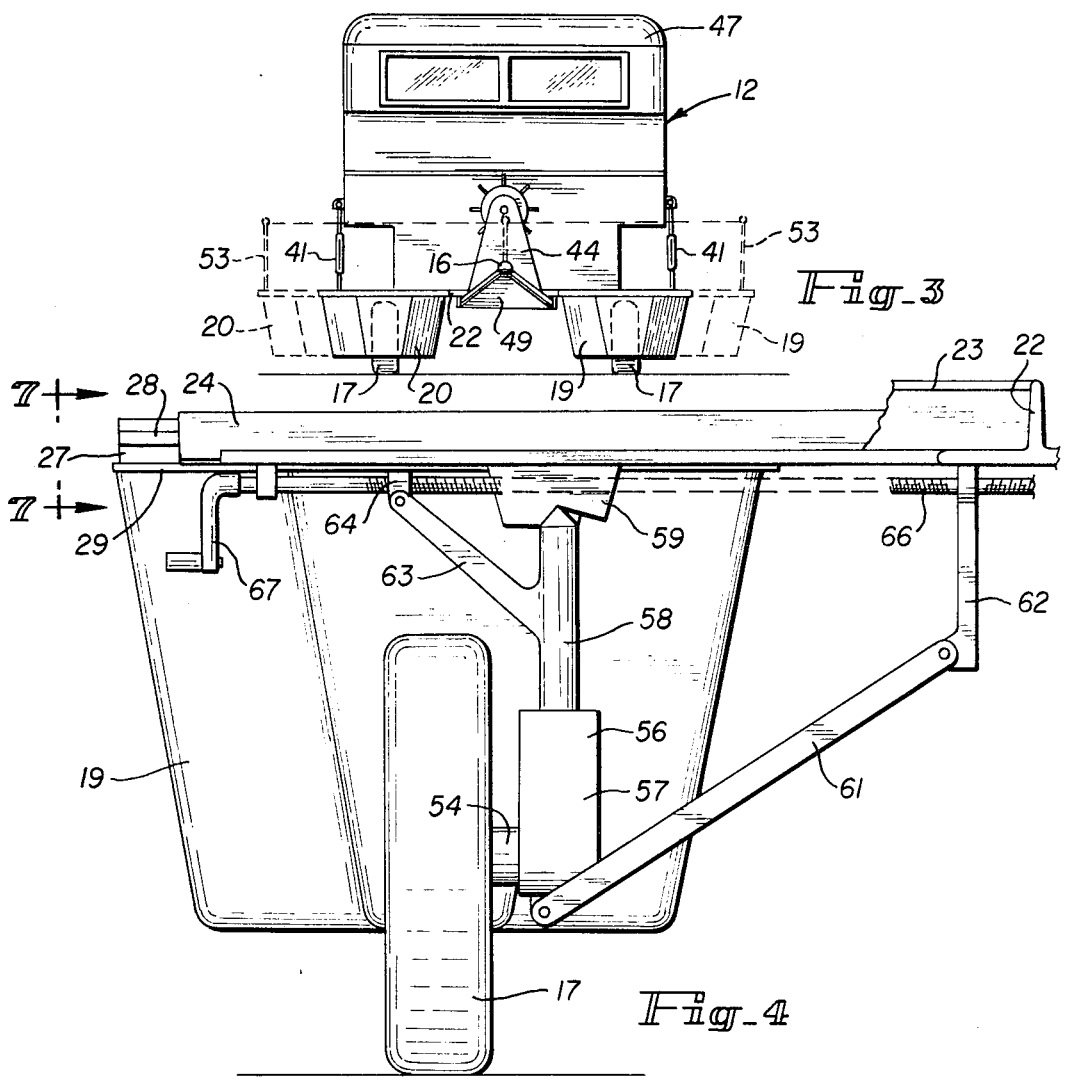
Fig. 3
Fig. 4
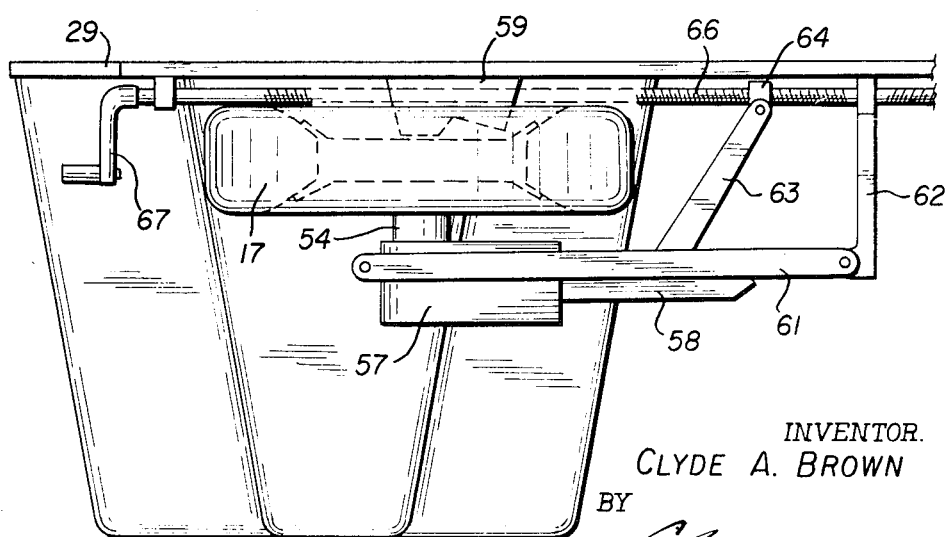
Fig. 5
INVENTOR.
CLYDE A. BROWN

PATENTED DEC 28 1971 3,629,884
SHEET 3 OF 3
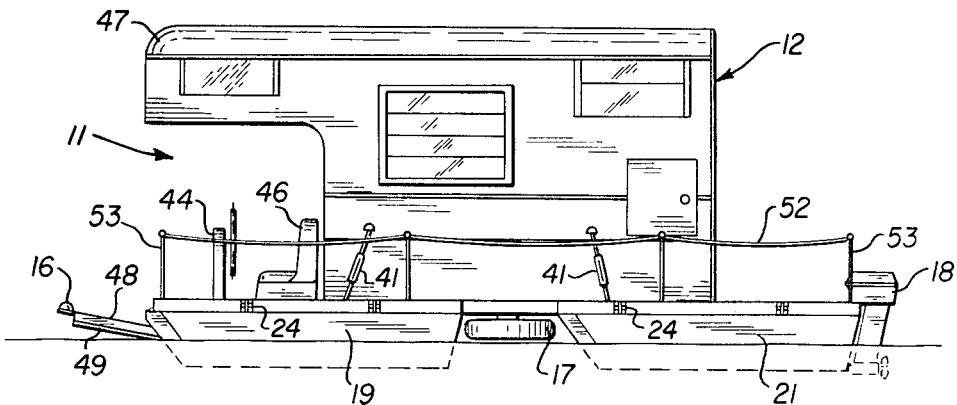
Fig_6
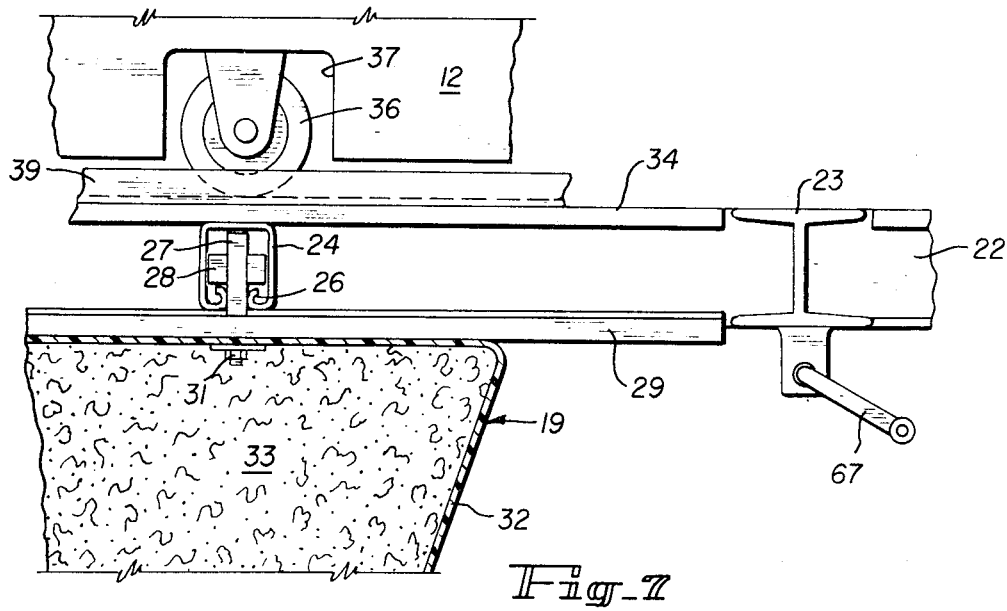
Fig_7
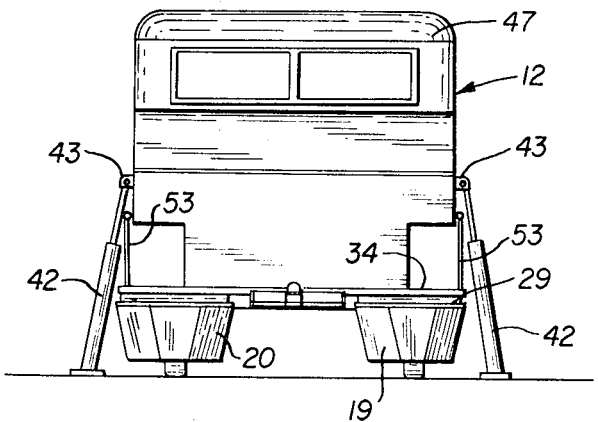
Fig_8
INVENTOR.
CLYDE A. BROWN
BY
ATTORNEY 3,629,884

CAMPER-BOAT-TRAILER

BACKGROUND OF THE INVENTION

In recent years many types of campers have been sold that are used by owners for recreation and business purposes. These campers are usually applied to the bed of a pickup truck or similar carrier so that the campers may be moved to chosen recreational site. The utilities and convenience now provided by these units is quite extensive in order to provide protection, shelter and comfortable accommodations for family groups. Where the cab-over-type campers are used, additional shelter, an occupant observation space and/or a bed is provided in a position extending forwardly and over the top of the operator cab for the truck or vehicle.

Currently various types of boating activities are being similarly enjoyed by families. Houseboats are used extensively for lake and river cruising. The facilities and utilities provided by modern houseboat configurations are likewise quite extensive. Due to similarities in user requirements and in the recreational activities being followed, the type of facilities provided by houseboats and by campers is similar. Regretably the expense of purchasing and maintaining duplicate facilities has heretofore limited the number of participants who have been able to enjoy both camper and houseboat recreational activities.

The present invention is developed to extend the enjoyment and benefit of houseboat ownership to owners of camper units by providing a pontoon boat or float support that is adapted to receive and hold a camper for over-water transport and use. With such a combination of components camper units will provide living accommodations and protection for owners when either land or water activities are being followed.

SUMMARY OF THE INVENTION

In order to accomplish the desirable purpose set forth above, the present invention provides a boat-trailer unit that may be mover over land as a towed unit behind a pickup carrier. The boat-trailer has a main support platform adapted to receive and support the camper normally carried by the pickup. A plurality of pontoons are disposed beneath the trailer platform adjacent the support wheels of the trailer. The pontoons are reciprocally movable in a direction transverse to the length of the trailer so they may be moved inwardly when the trailer is operated over land thereby minimizing the road clearance configuration. Alternately the pontoons may be moved outwardly into an improved outrigger support position when the boat-trailer is in the water. Before the boat-trailer is moved into the water the camper will be moved from the truck to a secure position on an expanded boat deck provided by the boat-trailer combination.

BRIEF DESCRIPTION OF THE DRAWINGS

FIG. 1 is a side elevation showing features of the invention,

FIG. 2 is a side elevation with parts in alternate position showing the camper on the boat-trailer, FIG. 3 is a front view with parts shown in alternate position, FIG. 4 is a partial side view showing a wheel mount assembly in road position, FIG. 5 is a similar partial side view showing the wheel mount assembly of FIG. 4 in an alternate retracted or water position, FIG. 6 is a side view showing the camper-boat-trailer configured for water use, FIG. 7 is a partial side view taken in the direction of the line 7—7 of FIG. 4 showing further details and construction features, and FIG. 8 is a front view similar to that of FIG. 3 showing a camper loading procedure with the boat-trailer passing inside camper jack supports.

DESCRIPTION OF THE PREFERRED EMBODIMENTS

A preferred embodiment of the invention is shown in FIGS. 1, 2, and 6 which depict the various use configurations for the combination unit. In FIGS. 2 and 6 the camper-boat-trailer unit 11 is shown. In FIG. 1 a nonassembled alternate configuration for the components making up the total combination is illustrated.

In FIG. 1 a cab-over-type camper 12 is received and carried in the bed 13 of a pickup truck 14. A boat-trailer unit 15 is attached to the truck by a conventional hitch 16 so that the boat-trailer may be pulled along the road on its wheel supports 17. An outboard engine or other water-propelling drive unit 18 may be attached to and mounted on a rear transom of the boat-trailer 15. A plurality of pontoons 19 and 21 are shown. Similar pontoons, such as the pontoon 20, are disposed on an opposite side of the trailer frame 22. When the vehicle is in the road configuration as shown in FIG. 1, the pontoons are substantially aligned with the wheels 17 and the pontoons are then substantially within the exterior width limitations of the camper 12. This overall alignment and width configuration is shown in full line representation in FIG. 3 and 8.

Details of the trailer frame construction are in part shown in FIG. 7, where a main longitudinal element of the frame 22 is of an inverted T section and wherein an H-beam 23 extends laterally from the central frame to provide support for the wheel assemblies. The pontoons 19 are mounted on the frame 22 and are supported thereon by a plurality of transversely extending box channels 24 which pass through or are joined to the inverted T section of the central frame 22. The box channel supports are preferably of the "Unistrut" type which provide a slot 26 in a lower face to reciprocally receive a support bar 27. Arm segments 28 are welded to the support bar 27 to obtain a cross shape that can move reciprocally with respect to supporting channels 24 but which will be retained therein. An extension deck 29 and the pontoons 19–21 are attached to the support bars 27 by fasteners 31 which extend through the outer fiberglass skin 32 of the pontoons and extension deck 29 to be received by the bars 27. With this arrangement the pontoons, the extension decks 29 and the support bars 27 may be moved reciprocally to retracted and extended positions, as shown in FIG. 3. When the pontoons are in their retracted position, the width is substantially reduced to correspond with the width of the camper 12. Accordingly, the trailer may be used on all highways without exceeding width limitations. When the apparatus is to be used in the water, the pontoons are moved to an extended position to thereby provide outrigger-type flotation and accordingly improved stability.

While the pontoons may be formed of wood or metal, a fiberglass-type hull is now preferred. For purpose of safety may hollow pontoon structure is preferably filled with a type of cellular foam 33 so that any damage to the pontoon structure will not substantially change the flotation characteristics thereof. The boat-trailer platform is completed by a center deck 34 which is affixed to the frame components and which may be supported by the H-beams 23 or the plurality of box channels 24. Center deck 34 provides a platform adapted to receive and support the camper 12 when the camper is repositioned on the boat-trailer combination.

Alternate methods are provided for moving the camper from the truck 14 to the boat-trailer 15. In accordance with a first system shown in FIGS. 1, 2, and 7 the camper 12 is mounted on a plurality of rollers 36 that may be disposed in pockets 37 formed in the camper structure 12. A ramp 38 will be carried by the truck or on the top of the trailer platform 34. This ramp 38 is disposed to span a position between the bed 13 of the truck and the center deck 34 for the trailer. The rollers are moved along the length of the truck bed 13 and along the ramp 38 until the camper is in desired position on boat-trailer 15. An angle iron guide rail 39 may be disposed on the center deck 34 to guide and restrain the rollers 36. When the camper is in desired position, the same turnbuckles 41 that are normally used to hold the camper on the truck bed 13 may be used to tie down and hold the camper in desired position on the deck 34 of boat-trailer 15.

An alternate method for changing the position of the camper is shown in FIG. 8. In connection with this system camper jacks 42 of conventional construction are applied to lifting pads 43 on the sides of the camper 12. The camper is raised above the bed of the truck, and thereafter the truck is moved out from under the camper. The truck is moved forwardly in a straight line, and the deck 34 and pontoons of the boat-trailer 15 are moved into position beneath the camper. Subsequently the jacks 42 are lowered to deposit the camper 12 on the trailer 15. When the pontoons are next extended laterally, the unit may be used in the water. The procedure is reversed when the camper is to be moved back onto the truck for onland uses.

When the boat is being prepared for use in the water, a control panel and capstan assembly 44 is raised to a user position as shown in FIGS. 2 and 6. Ignition, throttle and steering controls for the engine are provided by this panel. Cables may be used for transmitting steering and throttle forces from such forward position to a rear mounted engine 18 or engines. The panel 44 is pivotally mounted with respect to the trailer frame and deck so that it may be stored in a lowered position, as seen in FIG. 1. When in the lowered position the camper may be moved past control panel 44 without interference. No adjustments in cable lengths are necessary, since the cables can be arranged for proper tension when the control unit is in its operative raised position.

An operator seat 46 can be provided adjacent the controls 44. When the unit is to be used in the water, an operator sitting in the seat 46 is substantially in a near identical position of orientation with respect to the camper 12, and especially the cab-over portions 47 thereof, as he would be if the camper is on the truck. In either position the cab-over compartment 47 is above the operator's head. For the on-water configuration this placement provides a canopy protecting the operator from rain and sun.

Other features of the trailer also present beneficial features when the unit is used in water. If the forward extension 48 of the trailer which provides a mounting for hitch 16 is pivoted as it often is to provide improved trailer handling or to provide for height adjustments which make it possible to move the trailer bed platform 34 to a position of alignment with respect to the bed of the truck, the same pivoting feature can be used in the boat configuration to provide a prow and splash shield. If the forward extension 48 is of conventional Y-form configuration, a closure panel 49 is to be applied to the underneath surface thereof. This panel 49 is useable as a support for miscellaneous supplies or utilities, such as compressed gas bottles when the unit is used on land. On water the forward extension 48 will be slightly elevated, and this same closure panel 49 will then tend to intercept and ride any bow wave created by the forward movement of the pontoons. Further, it will provide a splash shield protecting the operator or other passengers. These beneficial features providing height adjustments for land use and improved planing characteristics for in-water uses is achieved by pivotally mounting the forward extension 48 with respect to the main frame 22 of the trailer 15. A pivot 51 for the accomplishment of such beneficial result is shown in FIG. 1 and 6.

When the unit is to be used in water, several additional features can be beneficially incorporated. A guard rail 52 as shown in FIGS. 3 and 6 may be applied. Such guard rail may be mounted with the upright support posts 53 on pivots so they may be folded down, or the posts 53 may also be applied to the outer edges of the laterally movable pontoon extension decks 29 as shown in FIG. 8. With this arrangement the posts will be telescoped inwardly against the sides of the camper 12 when the pontoons are moved inwardly.

A retractable mount for the wheels 17 is shown in FIGS. 4 and 5. This mount makes it possible to move the wheels to an out-of-way position when the boat-trailer 15 is to be used in the water. In the stored or retracted position as shown in FIG. 5, the wheel is substantially above a normal flotation line for the entire unit, and accordingly the drag resistance of the unit in water can be substantially reduced. When the pontoons 19–21 are provided with an efficient hydro-dynamic hull shape, the assembled unit can be operated at a speed making extended cross water courses enjoyable and feasible. While added horsepower and propulsion may be provided by additional engines, it is believed to be first desirable to minimize the drag coefficient for the overall unit. In the mounting shown in FIGS. 4 and 5 which is directed to this purpose, the wheels 17 rotate freely on axles 54 that are mounted on struts 56. The strut components internally provide spring and damping elements (not shown) which are operative between the housing 57 and arm 58. The arm 58 is engaged against a frame block 59 when the wheel is in the use position. A link 61 interconnects housing 57 and a frame anchor 62 to provide additional lateral stability. Arm 58 has an operator extension 63 that is pivotally joined on follower nut 64 of a nut and screw combination. The threaded screw 66 may be rotated by the handle 67 so that the nut 64 will be moved to the alternate positions as shown. As the nut moves inwardly, the components will be moved to their alternate out-of-way positions as shown in FIG. 5, and the wheel will accordingly be brought into a stored position just below extension deck 29. In this alternate raised position the wheel will be substantially out of contact with the water, as shown in FIG. 6.

When the boat-trailer is to be removed from the water, handle 67 will be operated and the wheel will again be extended to its position as shown in FIG. 4. In such position it should be noted that the main railer support forces are transmitted by the strut 56 to the arm 58 and to the frame block 59. These elements 58 and 59 are cooperatively formed to be held and locked in position. Accordingly, the full force carried by the wheel 17 is transmitted to the H-frame component 23. Added utility is obtained through use of this retractable wheel installation, since the wheel support is useable when the unit is to be removed from the water. The camper-boat-trailer unit can be moved to a dock or right to a boat-landing ramp under power from engine 18. The hitch 16 can then be engaged to the truck, and thereafter the wheels 17 can be moved to their extended position. Extension of the wheels will often bring the wheels into contact with a loading ramp, and thereafter the total unit may be moved to an on-shore location.

If the unit is only to be moved between camp sites or lakes, the camper 12 can be kept on the boat-trailer 15, and it can still be used to provide user accommodations. With this arrangement the truck itself can be detached for additional transportation or sightseeing uses. Backroads that ordinarily would be avoided due to the weight and bulk of the camper can then be travelled. On the other hand, when major distances are to be covered over improved roads, the camper can be reinstalled on the truck, and the boat-trailer 15 will be towed behind. In this configuration, as shown in FIG. 1, top highway speeds can easily be maintained, since the boat-trailer is essentially of a low-weight-type construction. Even in this configuration the overall combination has additional utility, since the flat platform provided by the center deck 34 can be used for additional equipment and supplies storage. Various types of camping paraphernalia, even inclusive of small boats and the like, can be conveniently transported.

I claim:

1. A combination boat and trailer unit useful for land and water purposes and of a type to be trailed behind a pickup truck or similar vehicle comprising a main frame, support members disposed transversely of said main frame, wheels on said unit for the movement of said unit along a supporting land surface, flotation members joined to said support members for the alternate support of said unit on water surfaces, said flotation members being reciprocally movable in direction disposed transversely to said main frame for extension and retraction with said flotation members in the retracted position being disposed within standard highway width limitations for onland use and said flotation members being extendable outwardly to provide outrigger support and improved stability for said unit for in-water uses, a center deck for said unit of width corresponding to the retracted width of said flotation members adapted to receive and support objects disposed thereon in either the water or land configurations, and extension decks for said unit mounted on and adapted to move reciprocally with said flotation members to provide a walkway disposed outwardly from said center deck when the flotation members are extended for in-water use and inwardly to an out-of-way stored position beneath said center deck when retracted for onland use.

2. The combination unit of claim 1 and further comprising a forwardly extending hitch mount movably disposed on the frame for said boat-trailer unit whereby said hitch mount is movable to adjusted positions for onland useage facilitating cooperative positioning of said truck and boat-trailer unit and is further movable to provide an upwardly extending prow for said unit of decreased frontal resistance during in-water uses.

3. The combination unit of claim 2 and further comprising a platform on said hitch mount and movable therewith to provide a splash shield during in-water uses of said unit.

4. The combination unit of claim 2 wherein a camper of a size to be carried by said pickup truck provides a passenger accomodations enclosure for selective disposition on and support by said truck or by said center deck, guide elements on said boat-trailer center deck to facilitate the placement and removal of said camper, and means for changing the positioning of said hitch mount to improve the alignment between said truck and boat-trailer center deck to facilitate the transfer of said camper.

5. The combination unit of claim 4 and further comprising camper jacks for engagement with lateral sides of said camper and the ground to elevate the camper above the jack supporting ground and wherein said jacks are disposable in positions wider than the retracted width of said flotation members whereby the camper may be changed from truck to boat-trailer by movements of said truck and boat-trailer combination.

6. The combination unit of claim 1 wherein a camper of a size to be carried by said pickup truck provided a passenger accomodations enclosure for selective movement from said truck to a position on said center deck, control and steering mechanisms for steering said unit during in-water uses operatively disposed forwardly on said boat-trailer in the direct path for removal and installation of said camper, and means for retracting said control and steering mechanisms to avoid interferences with said camper when the passenger accommodations camper is installed and/or removed past the operative position for said control and steering mechanisms.

7. The combination unit of claim 6 wherein said camper is of the cab-over type with the cab-over extension being positioned to provide protection for a boat-trailer operator positioned at the control and steering mechanisms during in-water uses and for a truck operator during onland uses.

* * * * *